US009461994B2

(12) United States Patent
Scott-Nash et al.

(10) Patent No.: US 9,461,994 B2
(45) Date of Patent: Oct. 4, 2016

(54) TRUSTED COMPUTING BASE EVIDENCE BINDING FOR A MIGRATABLE VIRTUAL MACHINE

(71) Applicant: Intel Corporation, Santa Clara, CA (US)

(72) Inventors: Mark E. Scott-Nash, Boulder, CO (US); Annapurna Dasari, Fremont, CA (US); Willard M. Wiseman, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 14/554,467

(22) Filed: Nov. 26, 2014

(65) Prior Publication Data

US 2016/0149912 A1    May 26, 2016

(51) Int. Cl.
*H04L 9/32* (2006.01)
*H04L 29/06* (2006.01)

(52) U.S. Cl.
CPC ....... *H04L 63/0876* (2013.01); *H04L 63/0457* (2013.01); *H04L 63/0853* (2013.01)

(58) Field of Classification Search
CPC ........... H04L 63/0876; H04L 63/0457; H04L 63/0853
See application file for complete search history.

(56) References Cited

U.S. PATENT DOCUMENTS

| 8,832,452 B2 | 9/2014 | Johnson |
| 2006/0020781 A1 | 1/2006 | Scarlata et al. |
| 2009/0049510 A1* | 2/2009 | Zhang ............... G06F 21/53 726/1 |
| 2009/0064292 A1 | 3/2009 | Carter et al. |
| 2009/0086979 A1 | 4/2009 | Brutch et al. |
| 2010/0058323 A1 | 3/2010 | Shahidzadeh et al. |
| 2010/0161998 A1* | 6/2010 | Chen ............... G06F 21/57 713/189 |
| 2012/0159184 A1 | 6/2012 | Johnson |
| 2014/0006776 A1 | 1/2014 | Scott-Nash et al. |
| 2014/0282868 A1 | 9/2014 | Sheller |

FOREIGN PATENT DOCUMENTS

WO    WO2015-094326    6/2015

OTHER PUBLICATIONS

Bare, Christopher J., "Attestation and Trusted Computing," CSEP 590: Practical Aspects of Modern Cryptography, Mar. 2006, 10 pages.

(Continued)

*Primary Examiner* — Techane Gergiso
(74) *Attorney, Agent, or Firm* — Trop, Pruner & Hu, P.C.

(57) ABSTRACT

In an embodiment, at least one computer readable medium has instructions stored thereon for causing a system to cryptographically sign, at a secure platform services enclave (PSE) of a computing system and using a secure attestation key (SGX AK), a public portion of a trusted platform module attestation key (TPM AK) associated with a trusted computing base of a physical platform, to form a certified TPM AK public portion. Also included are instructions to store the certified TPM AK public portion in the PSE, and instructions to, responsive to an attestation request received from a requester at a virtual trusted platform module (vTPM) associated with a virtual machine (VM) that has migrated onto the physical platform, provide to the requester the certified TPM AK public portion stored in the PSE. Other embodiments are described and claimed.

20 Claims, 5 Drawing Sheets

(56) References Cited

OTHER PUBLICATIONS

Zimmer, Vincent, J., et al., "Management of Authenticated Variables," U.S. Appl. No. 14/317,909, filed Jun. 27, 2014, 50 pages.
Segall, Ariel, "Attestation and Authentication Protocols Using the TPM," MITRE Publication, Jun. 21, 2011, 34 pages.
Pate, Steve, "Intel SGX Holds a lot of Promise for Secure Cloud Computing," HyTrust Blog, https://www.hytrust.com/blog/intel-sgx-holds-a-lot-of-promise-for-secure-cloud-computing/, Mar. 19, 2014, 2 pages.
Rutkowska, Joanna, "Thoughts on Intel's upcoming Software Guard Extensions (Part 1)," The Invisible Things Lab's blog, http://theinvisiblethings.blogspot.com/2013/08/thoughts-on-intels-upcoming-software.html, Aug. 30, 2013, 11 pages.
Wikipedia, "Trusted Platform Module," https://en.wikipedia.org/wiki/Trusted_Platform_Module, accessed Oct. 6, 2015, 8 pages.
International Searching Authority, "Notification of Transmittal of the International Search Report and the Written Opinion of the International Searching Authority," mailed Mar. 25, 2016 in International application No. PCT/US2015/056859.

* cited by examiner

TRUSTED COMPUTING BASE EVIDENCE BINDING FOR A MIGRATABLE VIRTUAL MACHINE

TECHNICAL FIELD

Embodiments pertain to trusted computing.

BACKGROUND

A virtual machine (VM) is computing entity that emulates a computer system, and may operate on any of several hardware platforms. A particular VM may operate on a first hardware platform during a first time slot and on a second hardware platform during a second time slot. That is, the VM may migrate between various physical platforms ("migratable VM").

A trusted computing base (TCB) of a physical platform may include underlying virtualization infrastructure. For example, the TCB of a particular physical platform may include a processor, basic input-output system (BIOS), hypervisor, and virtualization helper virtual machines.

DETAILED DESCRIPTION

Attestation of a VM may be carried out to ensure security of a system that includes the VM and an underlying physical platform. Security implies that the VM has booted with trusted software (e.g., verified by integrity measurements of physical platform, virtualization infrastructure software, virtual platform software, and the VM). Integrity measurement ("measurement" herein) of the physical platform and underlying virtualization infrastructure can be accomplished by a physical trusted platform module (pTPM). The pTPM typically includes a hardware entity, and has a trusted public/private key that may be burned into the hardware during production. The pTPM may be capable of public key cryptographic operations, computation of hash functions, integrity measurement, attestation, and other functions associated with trusted computing.

Migratable VMs may be measured to ensure that a particular level of security is being maintained. Measurement may be achieved by a virtual TPM (vTPM), which may be a software entity associated with a particular migratable VM. In embodiments, a particular vTPM may be implemented as a migratable VM, which may allow the virtualization infrastructure to operate at greater efficiency than, e.g., through inclusion in a hypervisor. Attestation requests to the VM may be communicated to its associated vTPM.

Embodiments presented herein provide a method to facilitate attestation of a migrated VM by binding of the vTPM to a physical TPM (pTPM) associated with an underlying physical platform on which the migrated VM runs. Embodiments may rely on secure enclave functionality.

The vTPM may perform the attestation for the VM, and typically the underlying physical platform is unknown to the VM or to a verifier. However, the underlying physical platform is part of a trusted computing base (TCB), and hence full attestation will include pTPM evidence. Embodiments may integrate attestation evidence of the trusted computing base (TCB) into the associated vTPM to simplify migration of the VM/vTPM. Embodiments may also provide attestation evidence of the vTPM and of the VM.

Embodiments presented may rely on secure enclaves (e.g., SGX, from Intel Corporation) to provide protection and migration support for the vTPM, eliminating dependencies on generic software components (e.g., a hypervisor or a helper VM). Embodiments may rely on secure enclaves to help prove binding of the vTPM to the pTPM.

Figure 1:
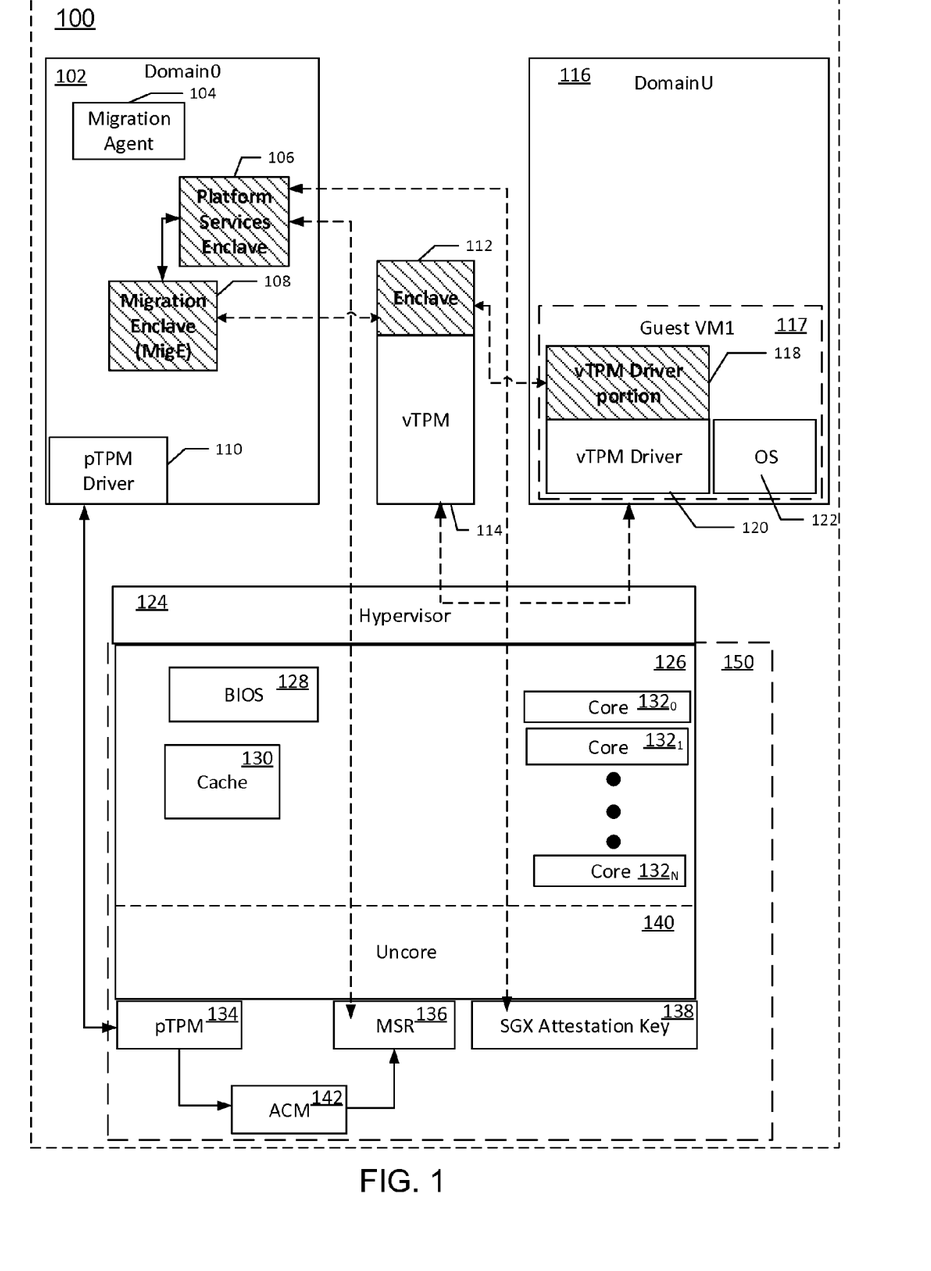
FIG. 1 is a block diagram of a system according to embodiments of the present invention.

FIG. 1 is a block diagram of a system 100, according to embodiments of the present invention. A physical platform 150 includes a pTPM 134, a model specific register (MSR) 136, an authenticated code module (ACM) 142, a software guard extension (SGX) attestation key 138, an uncore portion 140, and a core portion 126 that includes cores $132_0$-$132_N$, BIOS 128, and cache 130. A hypervisor 124 runs on the physical platform 150.

A domain0 102 includes a migration agent 104, a (secure) platform services enclave (PSE) 106, a (secure) migration enclave (MigE) 108, and a pTPM driver 110. A domainU 116 includes a guest VM1 117 that includes a vTPM driver portion 118, a vTPM driver 120, and an operating system (OS) 122. Additionally, a vTPM 114 that is associated with the guest VM1 117 is implemented and includes a secure enclave 112. A trusted computing base (TCB) of the guest VM1 117 includes the following TCB components:

1. The guest VM OS 122 and virtual BIOS (not shown)
2. Virtualization infrastructure including the hypervisor 122, and other portions of virtualization infrastructure (e.g., platform services enclave 106, migration enclave 108, and other entities within domain0 102) that have visibility into the VM1 117, BIOS, etc., and SGX infrastructure.

Entities that provide a root of trust for storage and reporting of the TCB components include the vTPM 114, the pTPM 130, and SGX implementation (e.g., SGX attestation key 136 and SGX infrastructure (not shown)). In FIG. 1, enclaves 106, 108, 112, and vTPM driver portion 118 are shaded to indicate that they are secure enclaves and have access to the (public/private) SGX attestation key 138 with which to encode items to be stored in, or accessed from, any secure enclave. The SGX attestation key 138 can serve as a root of trust for the enclaves 106, 108, 112, and 118, which may be used to protect secrets within the enclaves 106, 108, 112, and 118.

In embodiments, an attestation request made to the vTPM 114 returns attestation evidence of each of the TCB components (e.g., guest VM OS 122, virtual BIOS, and virtualization infrastructure). The vTPM 114 is implemented using secure enclave 112. The vTPM 114 may be bound to the physical platform via a pTPM attestation key, and attestation evidence for the (SGX) TCB can be provided through the SGX attestation infrastructure, e.g., secure enclaves 106, 108, and 112.

During migration of a VM, such as guest VM1 117, binding of the pTPM 134 to the vTPM 114 may be lost and may need to be recertified, which can be done by the virtualization infrastructure. However, recertification of the pTPM-vTPM binding via the hypervisor and/or another virtualization infrastructure entity can be done only if both the hypervisor and the other virtualization infrastructure are trusted.

In embodiments, the platform services enclave (PSE) 106 provides a pTPM identity of the pTPM 134 to vTPM 114 via secure enclave 112, which is a portion of the vTPM 114. In one embodiment, the PSE 106 provides the pTPM identity to the vTPM 114 as follows:

1. At boot time and prior to a BIOS boot block, the authenticated code module (ACM) 142 asks the pTPM 134 for a TPM attestation key (TPM AK) public portion. The TPM AK public portion is saved into the MSR 136, and the MSR 136 is then set to read-only mode.
2. The MSR 136 can be read by a secure architectural enclave, e.g., the PSE 106, which is a part of the secure attestation infrastructure. The TPM AK public portion provides evidence that the PSE 106 is on the same physical platform as the pTPM 134.
3. The TPM AK public portion can be certified (e.g., signed) by the PSE 106 using the SGX attestation key 138 (in some embodiments the SGX attestation key 138 is an enhanced privacy identification (EPID) key) and the signed AK public portion can be provided to any requesting secure enclave (e.g., architecture service and/or application enclave), responsive to a request to the PSE 106. Certifying the TPM AK public portion using the SGX attestation key 138 binds the pTPM 134 to the (SGX) trusted computing base.
4. When a VM/vTPM is migrated onto the physical platform 150 with help from a secure migration enclave MigE 108, the MigE 108 can request and receive the certified TPM AK public portion from the PSE 106. (Enclaves on the same physical platform have the same SGX attestation key. It can be established that the PSE 106 and the MigE 108 are on the same physical platform because they are in the same SGX key domain. The enclaves for the vTPM 114, MigE 108, PSE 106, and vTPM driver 118 are all aware of whether or not they are on the same physical platform.) The certified TPM AK public portion serves as proof that the MigE 108 is running on the same physical platform 150 as the PSE 106, and the proof can be used as evidence that the pTPM 134, the PSE 106, and the MigE 108 are running on the same physical platform 150. The MigE 108 then provides as evidence, the certified TPM AK public portion to the vTPM 114 via the enclave 112. Thus, a chain of trust is built as follows: The PSE 106 and the MigE 108 are in the same SGX key domain that is provided by the physical platform hardware. The vTPM 114 and the VM 117 (via the vTPM driver portion 118) are in the SGX key domain created by the MigE 108. The vTPM 114 and the VM1 117 trust the pTPM attestation (e.g., certified TPM AK public portion) provided by the MigE 108.
5. When a request is issued to the vTPM 114 to provide full TCB evidence (e.g., including vTPM measurement, pTPM measurement, and SGX report), the vTPM 114 can return the certified TPM AK public portion to the verifier along with measurement evidence of the VM (e.g., obtained via an SGX report) to prove that the guest VM is running on the same physical platform 150 and is thus bound to the pTPM 134. It can be proven that the MigE 108, vTPM 114 and the VM1 117 are on the physical platform 150 because their attestations point back to the MigE 108 and the MigE 108 will only create SGX key domains for a VM that runs on its physical platform (e.g., physical platform 150). (Note that the vTPM 114 and VM1 117 are to be migrated to the same physical platform 150.) The vTPM 114 can thus access evidence of the trusted computing base (TCB) upon request.

The above-described procedure allows the vTPM 114 to migrate and rely only on "generic" VM and SGX migration functions, rather than to rely on special migration functions that are specific to a particular type of VM.

Figure 2:
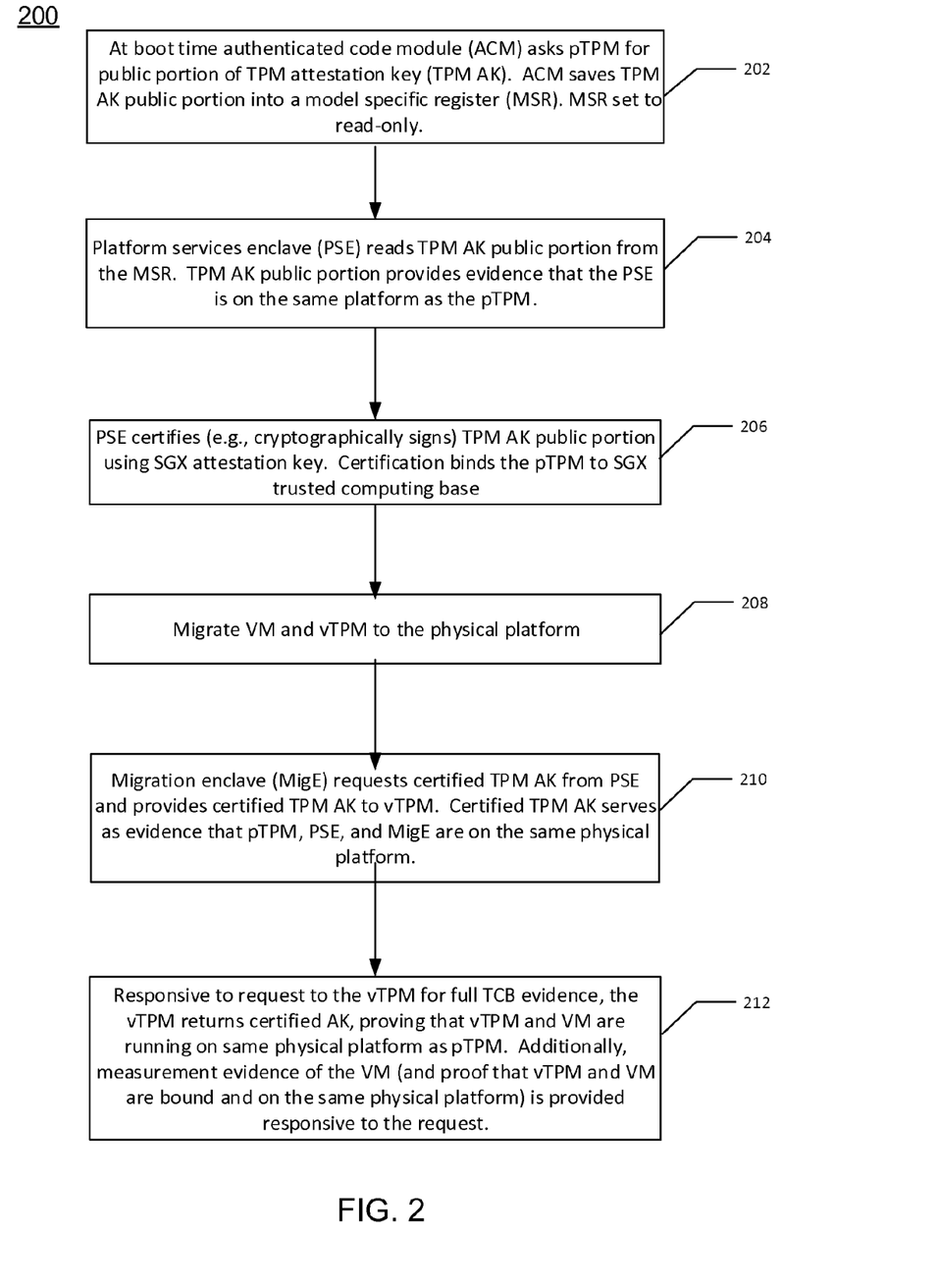
FIG. 2 is a flow diagram of a method, according to embodiments of the present invention.

FIG. 2 is a flow diagram of a method 200, according to embodiments of the present invention. At block 202, at boot time an authenticated code module (ACM) asks a platform trusted platform module (pTPM) of a physical platform (e.g., SGX trusted computing base) for a public portion of an attestation key (TPM AK). The ACM saves the TPM AK public portion into a model specific register (MSR). After the TPM AK public portion is saved into the MSR, the MSR is set to read-only mode.

Continuing to block 204, a platform services enclave (PSE), which is a secure enclave, reads the TPM AK public portion from the MSR. The TPM AK public portion provides evidence that the PSE is on the same physical platform as the pTPM.

Advancing to block 206, the PSE certifies (cryptographically signs) the TPM AK public portion using a secure enclaves (SGX) attestation key. Certification binds the pTPM to an SGX trusted computing base of the physical platform.

Moving to block 208, a VM and associated vTPM are migrated to the physical platform. Proceeding to block 210, a (secure) migration enclave (MigE) requests the certified TPM AK from the PSE. A MigE receives the certified TPM AK and provides the certified TPM AK to the vTPM. (The VM and vTPM are in the same key space as the MigE, so trust is established by construction.) The certified TPM AK serves as evidence that the vTPM, the PSE, and the MigE are on the same physical platform.

Continuing to block 212, responsive to a request to the vTPM for full trusted computing base (TCB) evidence, the vTPM returns the certified TPM AK, proving that the vTPM and the VM are running on the same physical platform as the pTPM. Additionally, responsive to the request for full TCB evidence, measurement evidence of the VM, and proof that the vTPM is bound to the VM and is on the same platform as the VM (e.g., by placement of the vTPM driver in the VM), are provided.

Figure 3:
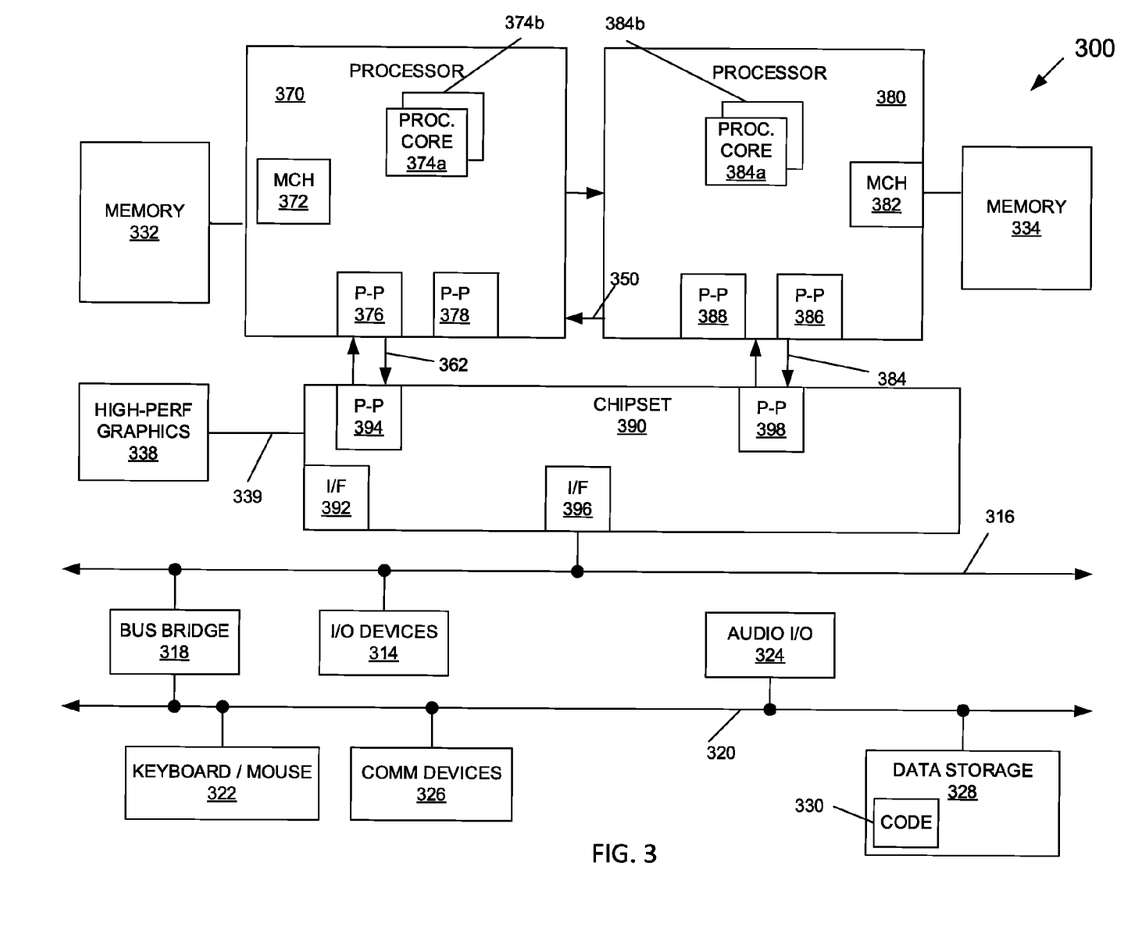
FIG. 3 is a block diagram of a system in accordance with an embodiment of the present invention.

Embodiments may be implemented in many different system types. Referring now to FIG. 3, shown is a block diagram of a system in accordance with an embodiment of the present invention. As shown in FIG. 3, multiprocessor system 300 is a point-to-point interconnect system, and includes a first processor 370 and a second processor 380 coupled via a point-to-point interconnect 350. As shown in FIG. 3, each of processors 370 and 380 may be multicore processors, including first and second processor cores (i.e., processor cores 374a and 374b and processor cores 384a and 384b ), although potentially many more cores may be present in the processors. Portions of one or both of the processors 370, 380, and/or portions of memories 332 and 334 may be included a trusted execution environment (TEE) and may enable migration of a VM with an associated vTPM that can provide proof that the VM and vTPM are bound to a pTPM associated with a physical platform that includes at least one of the processors 370, 380, and to a secure trusted computing base associated with the physical platform, according to embodiments of the present invention.

Still referring to FIG. 3, first processor 370 further includes a memory controller hub (MCH) 372 and point-to-point (P-P) interfaces 376 and 378. Similarly, second processor 380 includes a MCH 382 and P-P interfaces 386 and 388. As shown in FIG. 3, MCHs 372 and 382 couple the processors to respective memories, namely a memory 332 and a memory 334, which may be portions of system memory (e.g., DRAM) locally attached to the respective processors. The memory 332 and the memory 334 may include a trusted execution environment (TEE) portion including one or more secure enclaves, as in embodiments of the present invention. First processor 370 and second processor 380 may be coupled to a chipset 390 via P-P interconnects 362 and 384, respectively. As shown in FIG. 3, chipset 390 includes P-P interfaces 394 and 398.

Furthermore, chipset 390 includes an interface 392 to couple chipset 390 with a high performance graphics engine 338 via a P-P interconnect 339. In turn, chipset 390 may be coupled to a first bus 316 via an interface 396. As shown in FIG. 3, various input/output (I/O) devices 314 may be coupled to first bus 316, along with a bus bridge 318, which couples first bus 316 to a second bus 320. Various devices may be coupled to second bus 320 including, for example, a keyboard/mouse 322, communication devices 326 and a data storage unit 328 such as a disk drive or other mass storage device which may include code 330, in one embodiment. Further, an audio input/output (I/O) 324 may be coupled to second bus 320. Embodiments can be incorporated into other types of systems including mobile devices such as a smart cellular telephone, tablet computer, netbook, Ultrabook™, or so forth.

Figure 4:
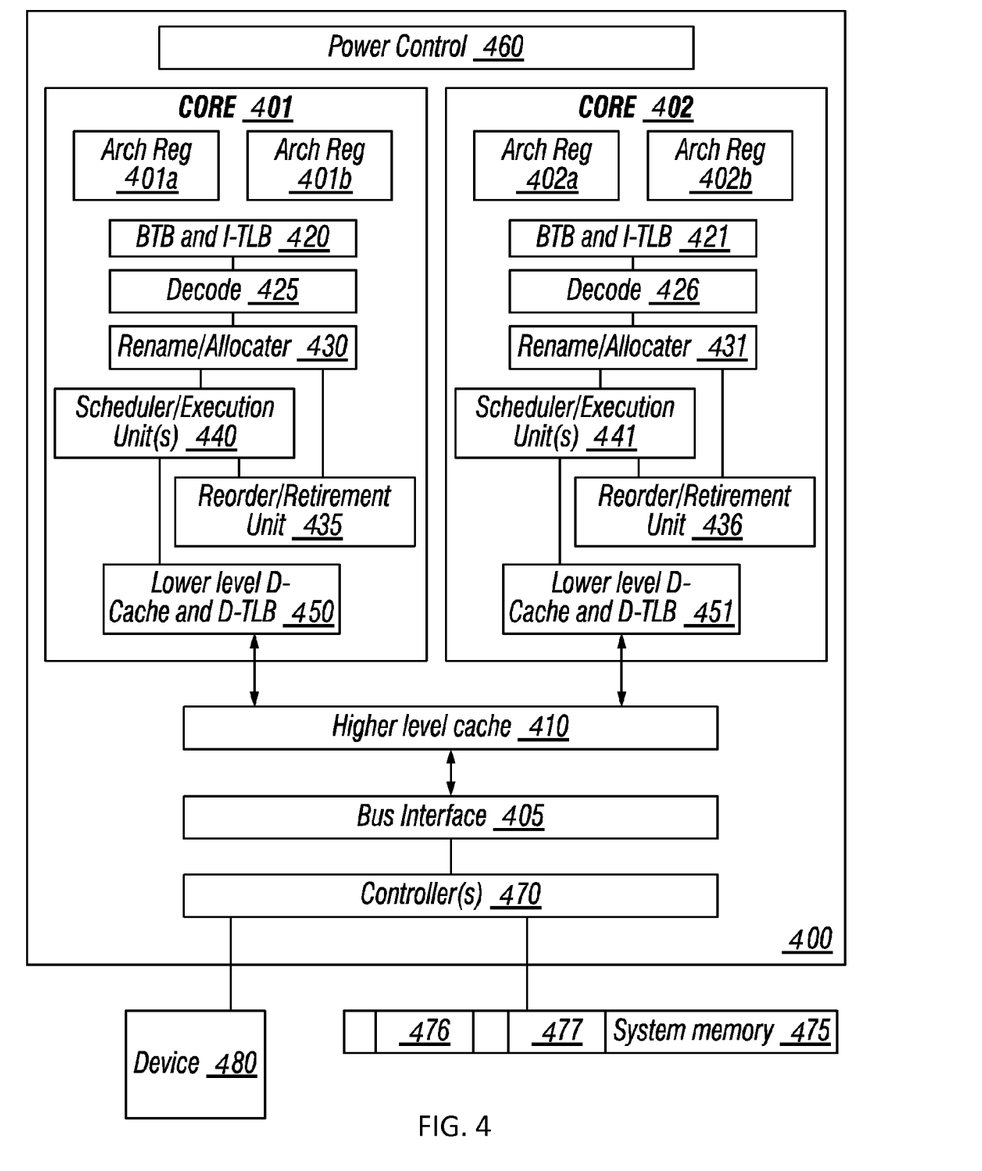
FIG. 4 is a block diagram of a processor that may be utilized in embodiments of the present invention.

FIG. 4 is a block diagram of a processor 400 that may be utilized in embodiments of the present invention. Processor 400 includes cores 401 and 402. Here, cores 401 and 402 are considered cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner. Either or both of cores 401 and 402 and/or portions of system memory 475, may be a part of a trusted execution environment that is to host a migratable virtual machine, (VM) and that has an associated vTPM. The vTPM may provide upon request, evidence (e.g., certified TPM AK that has been generated by a pTPM of a trusted computing base) that the vTPM is bound to the trusted computing base (TCB) that includes the processor 400, and that the VM is operating on the TCB, according to embodiments of the present invention.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
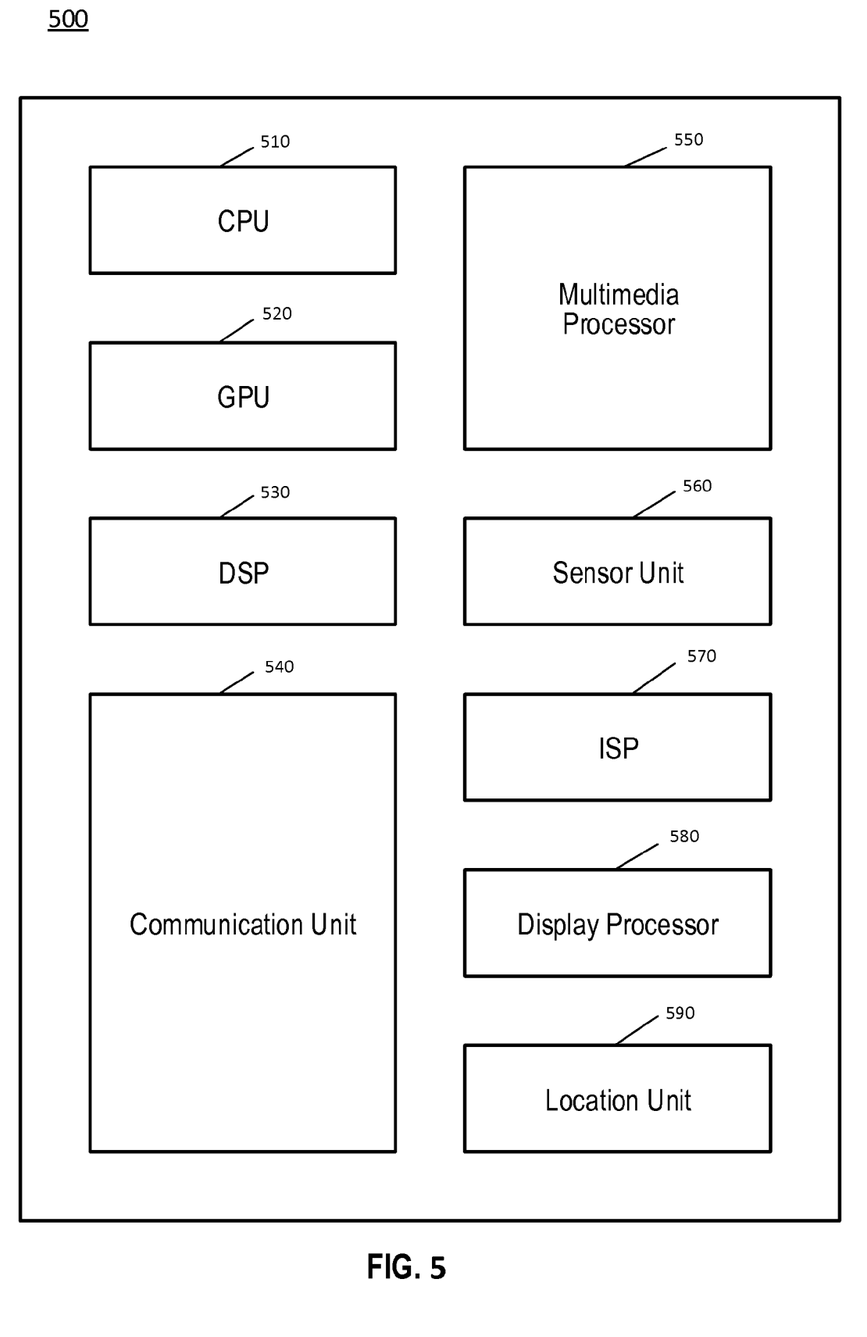
FIG. 5 is a block diagram of a system on a chip (SoC), according to embodiments of the present invention.

Referring now to FIG. 5, shown is a block diagram of a system on a chip (SoC). In the embodiment of FIG. 5, SoC 500 may include various circuitry to enable high performance for multimedia applications, communications and other functions. As such, SoC 500 is suitable for incorporation into a wide variety of portable and other devices, such as smartphones, tablet computers, smart TVs and so forth. In the example shown, SoC 500 includes a central processor unit (CPU) domain 510. In an embodiment, a plurality of individual processor cores may be present in CPU domain 510. As one example, CPU domain 510 may be a quad core processor having 4 multithreaded cores. Such processors may be homogeneous or heterogeneous processors, e.g., a mix of low power and high power processor cores. The SOC 500 may be utilized to host a VM according to embodiments of the present invention. For instance, a migrated VM may have an associated vTPM to provide, upon request, evidence (generated by a pTPM of a trusted computing base) that the VM is operating on the TCB, according to embodiments of the present invention.

A GPU domain 520 is provided to perform advanced graphics processing in one or more GPUs to handle graphics and compute APIs. A DSP unit 530 may provide one or more low power DSPs for handling low-power multimedia applications such as music playback, audio/video and so forth, in addition to advanced calculations that may occur during execution of multimedia instructions. In turn, a communication unit 540 may include various components to provide connectivity via various wireless protocols, such as cellular communications (including 3G/4G LTE), wireless local area techniques such as Bluetooth™, IEEE 802.11, and so forth.

Still further, a multimedia processor 550 may be used to perform capture and playback of high definition video and audio content, including processing of user gestures. A sensor unit 560 may include a plurality of sensors and/or a sensor controller to interface to various off-chip sensors present in a given platform. An image signal processor 570 may be provided with one or more separate ISPs to perform image processing with regard to captured content from one or more cameras of a platform, including still and video cameras.

A display processor 580 may provide support for connection to a high definition display of a given pixel density, including the ability to wirelessly communicate content for playback on such display. Still further, a location unit 590 may include a GPS receiver with support for multiple GPS constellations to provide applications highly accurate positioning information obtained using as such GPS receiver. Understand that while shown with this particular set of components in the example of FIG. 5, many variations and alternatives are possible.

Additional embodiments are described below.

In a first example, at least one computer readable medium has instructions stored thereon for causing a system to cryptographically sign, at a secure platform services enclave (PSE) of a computing system using a secure attestation key (SGX AK), a public portion of a trusted platform module attestation key (TPM AK) that is associated with a trusted computing base of a physical platform, to form a certified TPM AK public portion, to store the certified TPM AK public portion in the PSE. The instructions include, responsive to an attestation request received from a requester at a virtual trusted platform module (vTPM) associated with a virtual machine (VM) that has migrated onto the physical platform, instructions to retrieve by the vTPM the certified TPM AK public portion stored in the PSE and provide, by the vTPM, the certified TPM public portion to the requester.

In a second example that includes elements of the first example, the certified TPM AK public portion provided to the requester indicates that the VM is to run on the physical platform.

A third example includes elements of the first example. Additionally, the TPM AK public portion is to be generated by a physical trusted platform module (pTPM) that includes hardware coupled to the physical platform.

A fourth example includes elements of the third example, and further includes instructions to store the TPM AK public portion from the pTPM to a model specific register (MSR) of the physical platform.

A fifth example includes elements of the fourth example, and further includes instructions to provide the TPM AK public portion stored in the MSR to the PSE.

A 6$^{th}$ example includes elements of the 5$^{th}$ example, and further includes instructions to set the MSR to read-only after storage of the TPM AK public portion and prior to providing the TPM AK public portion stored in the MSR to the PSE.

A 7th example includes elements of the 6th example, and further includes instructions to provide the certified TPM AK public portion from the PSE to the vTPM via a secure migration enclave (MigE). The certified TPM AK public portion is to provide evidence that the vTPM, the PSE, and the secure MigE are to operate on the physical platform.

An 8th example includes elements of the 7th example. Additionally, the VM includes a VM secure enclave and the vTPM includes a vTPM secure enclave. Further, the MigE, the VM secure enclave, and the vTPM are in a common secure domain defined by the SGX AK.

A 9th example includes elements of any one of examples 1 to 8, and further includes instructions to provide attestation evidence of the VM and of the vTPM to the requester responsive to the attestation request.

A 10th example is a method that includes certifying, by a secure platform services enclave (PSE) via cryptographic signature using a secure attestation key (SGX AK) that is accessible by the PSE, a public portion of a trusted platform module attestation key (TPM AK) that is associated with a trusted computing base of a physical platform, to form a certified TPM AK public portion, and responsive to an attestation request received from a requester by a virtual machine (VM) that has migrated onto the physical platform, providing to the requester, by a virtual trusted platform module (vTPM) coupled to the VM, the certified TPM AK public portion.

An 11th example includes elements of the 10th example. Additionally, the certified TPM AK public portion is to indicate that the VM is to run on the physical platform.

A 12th example includes elements of the 10th example, and further includes prior to certifying, retrieving by the PSE the TPM AK public portion from a model specific register (MSR) of the physical platform.

A 13th example includes elements of the 12th example, and further includes prior to retrieving the AK public portion from the MSR by the PSE, retrieving, by an authenticated code module of the physical platform, the TPM AK public portion from a physical trusted platform module (pTPM) associated with the physical platform and placing the TPM AK public portion in the model specific register (MSR).

A 14th example includes elements of the 13th example. Additionally, certification of the AK public portion using the SGX AK binds the pTPM to a trusted computing base of the physical platform, the trusted computing base including at least one secure enclave.

A 15th example includes elements of the 14th example, and further includes providing the certified TPM AK public portion from the PSE via a secure migration enclave (MigE) to a vTPM secure enclave of the vTPM. The vTPM secure enclave is coupled to a VM secure enclave of the VM, and the certified TPM AK public portion is to serve as evidence that the VM, the vTPM, the PSE, and the MigE are to operate on the physical platform.

A 16th example includes elements of the 10th example, and further includes responsive to the attestation request providing, by the vTPM to the requester, attestation evidence associated with the VM.

A 17th example includes elements of the 15th example. Additionally, the vTPM includes a vTPM secure enclave and the VM includes a VM secure enclave, and the secure MigE, the vTPM secure enclave, and the VM secure enclave are in a common secure domain defined by the SGX AK.

An 18th example is an apparatus that includes means for performing the method of any one of examples 10 to 17.

A 19th example is an apparatus to perform the method of any one of examples 10 to 17.

A 20th example is a system that includes a physical platform including a processor and a platform services enclave (PSE) that includes a secure enclave to cryptographically sign, via a software extension attestation key (SGX AK), a trusted platform module attestation key public portion of a trusted platform module attestation key (TPM AK) associated with the physical platform, to form a certified trusted platform module attestation key (TPM AK) public portion. The system also includes a virtual machine (VM) that is migrated to the physical platform, the VM including a VM secure enclave that is secured via the SGX AK, and a virtual trusted platform module (vTPM) that is migrated to the physical platform, the vTPM having a vTPM secure enclave that is secured via the SGX AK and that is coupled with the VM secure enclave. Responsive to an attestation request received by the VM from a requester, the vTPM is to receive the certified TPM AK public portion stored in the PSE and to provide the certified TPM AK public portion to the requester.

A 21st example includes elements of the 20th example. Further, the physical platform includes a platform trusted platform module (pTPM) to generate the TPM AK public portion. The TPM AK public portion is associated with attestation of the physical platform.

A 22nd example includes elements of the 20th example. The physical platform further includes an authenticated code module (ACM) to request the TPM AK public portion from the pTPM and to store the TPM AK public portion to a model specific register (MSR) of the physical platform.

A 23rd example includes elements of the 22nd example. Additionally, after storage of the TPM AK public portion, the MSR is set to read-only, and after the MSR is set to read-only the PSE is to access the TPM AK public portion stored in the MSR.

A 24th example includes elements of one of examples 20 to 23. Additionally included is a secure migration enclave (MigE) to run on the physical platform. The secure MigE is to retrieve the certified TPM AK public portion from the PSE and to provide the certified TPM AK to a vTPM secure enclave of the vTPM responsive to the attestation request.

A 25th example includes elements of example 24. Additionally, the VM includes a VM secure enclave. The VM secure enclave, the vTPM secure enclave, and the secure MigE are within a secure domain defined by the SGX AK.

A 26th example includes elements of the 25th example. Additionally, responsive to the attestation request, the vTPM is further to provide evidence binding the VM, the vTPM, and the secure MigE in the secure domain.

A 27th example is an apparatus that includes secure platform services enclave (PSE) means for certifying, via cryptographic signature using a secure attestation key (SGX AK) that is accessible by the PSE means, a public portion of a trusted platform module attestation key (TPM AK) that is associated with a trusted computing base of a physical platform, to form a certified TPM AK public portion. The apparatus also includes virtual trusted platform module (vTPM) means associated with a virtual machine (VM) that has migrated onto the physical platform. The vTPM means is for providing to a requester the certified TPM AK public portion responsive to an attestation request received by the VM from the requester.

A 28th example includes elements of the 27th example, where providing the certified TPM AK public portion to the requester indicates that the VM is to run on the physical platform.

A 29th example includes elements of the 27th example. The PSE means is further for retrieving the TPM AK public portion from a model specific register (MSR) of the physical platform prior to certification by the PSE means.

A 30th example includes elements of the 29th example, and further includes an authenticated code module (ACM) means for retrieving the TPM AK public portion from a platform TPM (pTPM) and for placing the TPM AK public portion in the MSR prior to retrieving, by the PSE means, the TPM AK public portion from the MSR.

A 31st example includes elements of any one of examples 27 to 30, where certification of the AK public portion using the SGX AK binds the pTPM to a trusted computing base of the physical platform, the trusted computing base including the at least one secure enclave.

A 32nd example includes elements of the 31st example, and further includes secure migration enclave (MigE) means for providing the certified TPM AK public portion from the PSE means to the vTPM. The certified TPM AK public portion is to serve as evidence that the vTPM, the PSE means, and the secure MigE means are to operate on the same physical platform.

A 33rd example includes elements of the 32nd example. Additionally, responsive to the attestation request, the vTVM means is further to provide attestation proof of a secure state of the VM and the vTVM with respect to the SGX AK.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable medium having instructions stored thereon for causing a system to:
cryptographically sign, at a secure platform services enclave (PSE) of a computing system using a secure attestation key (SGX AK), a public portion of a trusted platform module attestation key (TPM AK) that is associated with a trusted computing base of a physical platform, to form a certified TPM AK public portion;
store the certified TPM AK public portion in the PSE; and
responsive to an attestation request received from a requester at a virtual trusted platform module (vTPM) associated with a virtual machine (VM) that has migrated onto the physical platform, retrieve, by the vTPM, the certified TPM AK public portion stored in the PSE and provide, by the vTPM, the certified TPM AK public portion to the requester.

2. The at least one non-transitory computer readable medium of claim 1, wherein the certified TPM AK public portion provided to the requester indicates that the VM is to run on the physical platform.

3. The at least one non-transitory computer readable medium of claim 1, wherein the TPM AK public portion is to be generated by a physical trusted platform module (pTPM) comprising hardware coupled to the physical platform.

4. The at least one non-transitory computer readable medium of claim 3, further comprising instructions to store the TPM AK public portion from the pTPM to a model specific register (MSR) of the physical platform.

5. The at least one non-transitory computer readable medium of claim 4, further comprising instructions to set the MSR to read-only after storage of the TPM AK public portion and prior to providing the TPM AK public portion to the PSE.

6. The at least one non-transitory computer readable medium of claim 5, wherein the TPM AK public portion is to be received by the PSE from the MSR.

7. The at least one non-transitory computer readable medium of claim 6, further comprising instructions to provide the certified TPM AK public portion from the PSE to the vTPM via a secure migration enclave (MigE), and wherein the certified TPM AK public portion is to provide evidence that the vTPM, the PSE, and the secure MigE are to operate on the physical platform.

8. The at least one non-transitory computer readable medium of claim 1, further comprising instructions to provide attestation evidence of the VM to the requester responsive to the attestation request.

9. A method comprising:
certifying, by a secure platform services enclave (PSE) via cryptographic signature using a secure attestation key (SGX AK) that is accessible by the PSE, a public portion of a trusted platform module attestation key (TPM AK) that is associated with a trusted computing base of a physical platform, to form a certified TPM AK public portion; and
responsive to an attestation request received from a requester by a virtual machine (VM) that has migrated onto the physical platform, providing to the requester, by a virtual trusted platform module (vTPM) coupled to the VM, the certified TPM AK public portion.

10. The method of claim 9, wherein the certified TPM AK public portion is to indicate that the VM is to run on the physical platform.

11. The method of claim 9, further comprising prior to certifying, retrieving by the PSE the TPM AK public portion from a model specific register (MSR) of the physical platform.

12. The method of claim 11 further comprising prior to retrieving the AK public portion from the MSR by the PSE, retrieving, by an authenticated code module of the physical platform, the TPM AK public portion from a physical trusted platform module (pTPM) of the physical platform.

13. The method of claim 12, wherein certification of the AK public portion using the SGX AK binds the pTPM to a trusted computing base of the physical platform, the trusted computing base including the at least one secure enclave.

14. The method of claim 13, further comprising providing the certified TPM AK public portion from the PSE to the vTPM via a secure migration enclave (MigE) to a vTPM secure enclave of the vTPM, wherein the vTPM secure enclave is coupled to a VM secure enclave of the VM, and wherein the certified TPM AK public portion is to serve as evidence that the VM, the vTPM, the PSE, and the MigE are to operate on the physical platform.

15. The method of claim 9, further comprising responsive to the attestation request providing, by the vTPM to the requester, attestation evidence associated with the VM.

16. A system comprising:
a physical platform including a processor;
a platform services enclave (PSE) comprising a secure enclave to cryptographically sign, via a software extension attestation key (SGX AK), a trusted platform module attestation key public portion of a trusted platform module attestation key (TPM AK) associated with the physical platform to form a certified trusted platform module attestation key (TPM AK) public portion;
a virtual machine (VM) that is migrated to the physical platform, the VM including a VM secure enclave that is secured via the SGX AK; and
a virtual trusted platform module (vTPM) that is migrated to the physical platform, the vTPM having a vTPM secure enclave that is secured via the SGX AK and that is coupled with the VM secure enclave, wherein responsive to an attestation request received by the VM from a requester, the vTPM is to receive the certified TPM AK public portion stored in the PSE and to provide the certified TPM AK public portion to the requester.

17. The system of claim 16, wherein the physical platform further comprises a platform trusted platform module (pTPM) to generate the TPM AK public portion, wherein the TPM AK public portion is associated with attestation of the physical platform.

18. The system of claim 17, wherein the physical platform further comprises an authenticated code module (ACM) to request the TPM AK public portion from the pTPM and to store the TPM AK public portion to a model specific register (MSR) of the physical platform.

19. The system of claim 18, wherein after storage of the TPM AK public portion, the MSR is set to read-only, and after the MSR is set to read-only the PSE is to access the TPM AK public portion stored in the MSR.

20. The system of claim 16, further comprising a secure migration enclave (MigE) to run on the physical platform, wherein the MigE is to retrieve the certified TPM AK public portion from the PSE and to provide the certified TPM AK to the vTPM secure enclave responsive to the attestation request.

* * * * *